(12) United States Patent
Cok

(10) Patent No.: US 7,375,473 B2
(45) Date of Patent: May 20, 2008

(54) VARIABLE POWER CONTROL FOR OLED AREA ILLUMINATION

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 155 days.

(21) Appl. No.: 11/107,163

(22) Filed: Apr. 15, 2005

(65) Prior Publication Data

US 2006/0232524 A1   Oct. 19, 2006

(51) Int. Cl.
   *H05B 37/02* (2006.01)
(52) U.S. Cl. ............................. 315/308; 315/51
(58) Field of Classification Search ............ 315/291, 315/307, 308, 51, 246; 345/76, 77
See application file for complete search history.

(56) References Cited

U.S. PATENT DOCUMENTS

| | | |
|---|---|---|
| 5,089,748 A | 2/1992 | Ihms |
| 5,493,183 A | 2/1996 | Kimball |
| 6,337,541 B1 | 1/2002 | Dickie et al. |
| 6,353,291 B1 | 3/2002 | Borgogno et al. |
| 2005/0190142 A1* | 9/2005 | Ferguson .................... 345/102 |
| 2005/0225519 A1* | 10/2005 | Naugler, Jr. ................ 345/77 |
| 2006/0001381 A1* | 1/2006 | Robinson et al. ........ 315/185 R |

* cited by examiner

*Primary Examiner*—Thuy Vinh Tran
(74) *Attorney, Agent, or Firm*—Frank Pincelli

(57) ABSTRACT

An OLED area illumination apparatus, comprising an OLED device, a variable power controller connected to the OLED device for providing variable power to the OLED device and responsive to a control signal, a feedback circuit for measuring the resistance of the OLED device and using the measurement signal for providing a control signal to control the variable power controller.

19 Claims, 4 Drawing Sheets

VARIABLE POWER CONTROL FOR OLED AREA ILLUMINATION

FIELD OF THE INVENTION

The present invention relates to organic light emitting diodes (OLEDS) for area illumination.

BACKGROUND OF THE INVENTION

Solid-state lighting devices made of light-emitting diodes are increasingly useful for applications requiring robustness and long-life. Organic light-emitting diode solid-state lighting devices are of great interest because they may provide a light-emitting area rather than a point source of light (as is found in inorganic light-emitting diodes). This attribute of organic light-emitting diode lighting devices reduces the maximum heat of the device and facilitates efficient extraction of light from the diodes in a lighting fixture or lumiere.

Organic light emitting diodes (OLEDs) can be manufactured by depositing materials on a substrate and encapsulating them with a cover or layer. This process enables the creation of single, monolithic lighting elements on a single substrate. For example, FIG. 2 illustrates an OLED device suitable for lighting. Referring to FIG. 2, a prior-art OLED solid-state lighting device 10 may comprise a substrate 102 with a first electrode 104 deposited thereon. One or more layers of organic material 106 may be deposited on the first electrode 104, as is known in the prior art. A second electrode 108 is formed over the one or more layers of organic material 106. An encapsulating cover 110 protects the electrodes 104 and 108 and the one or more layers of organic material 106. The encapsulating cover 110 may also be a layer coated over the second electrode 108 (not shown). The electrodes 104 and 108 pass beneath the encapsulation layer 110 and are exposed as connectors to an external power source 112. The connectors may be arranged in a variety of configurations and can include, for example, insulating layers 114. In operation, when the external power source 112 supplies a voltage to the electrodes 104 and 108, a current passes through the one or more layers of organic material 106 and causes the organic materials to emit light.

OLED devices are subject to a variety of manufacturing difficulties and are also subject to changes in performance as the OLEDs are used. For example, it can be difficult to maintain a consistent performance from one device to another, even when the devices are manufactured on a common substrate or in a common process. Likewise, as is well known, OLED devices become less efficient over time and output less light with the same amount of power.

Since the brightness of an OLED lamp depends on the magnitude of the applied voltage, a variety of techniques have been used to compensate for aging by increasing the voltage applied to the lamp as the lamp ages. The simplest control is a dimmer, with which one manually adjusts the brightness of the lamp to suit one's taste. For EL (Electroluminescent) lamps powered from an AC power source, a dimmer is simply a potentiometer in series with the lamp. Most EL lamps are driven by an inverter powered by a battery. The inverter typically includes a switching circuit that produces a series of pulses which are coupled to the lamp. The switching circuit can be self-oscillating or driven. Dimming inverters are known in the art and typically use pulse width modulation to change the voltage across the EL lamp.

Both manufacturing variability and OLED aging have been addressed in the prior art. For example, U.S. Pat. No. 6,353,291 by Borgogno et al. entitled "Electroluminescent lamp controller" describes electronic sensing circuits that monitor multiple sized EL cells, referred to as a lamp, and compensate for variations in contrast between cells, while maintaining a fixed contrast between the luminance of the cells and the ambient lighting. In one embodiment, three separate feedback loops monitor the ambient lighting, cell-luminance, and frequency of the excitation voltage and make appropriate adjustments to an adjustable luminance reference. In another embodiment the circuit that drives the EL cells includes a timer and a microprocessor. The timer measures the elapsed time during which the EL display has been operating. The microprocessor adjusts the drive signal to the EL display to correct for aging, based on the elapsed time measured by the timer and an empirically-determined aging parameter. All these adjustments are accomplished while a microprocessor sequences through a large assortment of electroluminescent cells of various sizes.

In a related approach, U.S. Pat. No. 5,493,183 by Kimball entitled "Open loop brightness control for EL lamp" discloses an EL lamp characterized by non-linear brightness decay that is driven to constant brightness for the life of the lamp by an inverter controlled by a microprocessor. The microprocessor controls the inverter in accordance with a table containing data that is the inverse function of the non-linear brightness decay. The microprocessor tracks the total on-time of the EL lamp and selects the appropriate data from the table for driving the lamp. Control can be analog or digital. If control is analog, the selected data is coupled to a D/A converter which is coupled to the inverter. If control is digital, the selected data is coupled to a counter driving a pulse width modulator which is coupled to the inverter. In accordance with another aspect of the invention, an EL lamp is dimmed a precise amount based upon the data in the table and the EL lamp can be dimmed in unison with other lamp types, each lamp type having a table containing data for dimming. However, such designs require expensive controls (e.g. a microprocess) for tracking device use and providing corrective control.

Automatic brightness controls include optical feedback, in which a photocell monitors lamp brightness and varies the applied voltage to obtain a predetermined brightness, and analogue feedback, in which a lamp property, such as capacitance, is monitored to determine the applied voltage. U.S. Pat. No. 5,089,748 by Ihms entitled Photo-feedback Drive System discloses a system including optical feedback for maintaining the brightness of an EL lamp. U.S. Pat. No. 6,337,541 by Dickie et al. entitled "Electroluminescent lighting device" describes a supplementary lighting device with a replaceable electroluminescent light element. A control system is provided to boost the light intensity of the electroluminescent light element. A light sensor is provided which detects light emitted from the electroluminescent lighting element and inputs this information to the control system. The control system automatically adjusts the intensity of the electroluminescent lighting element according to a pre-set value and the information from the light sensor. This allows for the electroluminescent lighting element to maintain a constant output despite the ageing of the electroluminescent lighting element. The pre-set value for the intensity of the electroluminescent lighting element can be adjusted by a user-controlled dimmer. The dimmer varies the amount of light detected by the light sensor in order to increase or decrease the power provided by the control system to the electroluminescent lighting element.

Such a design requires an expensive optical sensor and the location of the sensor makes designing a display difficult because the sensor must be hidden and one must make separate connections to the sensor and to the lamp. Unless precision sensors are used, the part-to-part variability in sensors may cause unacceptable results. Moreover, such optical feedback designs require a large number of additional and expensive components and are subject to error from ambient light.

It is also important that lighting devices in common use by consumers be compatible with the existing lighting infrastructure, for example the common screw-type base known in the United States and the pin-type bayonet bases used in Europe. Moreover, the lighting devices must be readily and safely replaced by consumers at minimal cost.

In view of the foregoing, it is therefore an object of the invention to provide a low cost system for maintaining the brightness of an OLED lamp as it ages. A further object of the invention is to provide a control system that uses minimal additional and inexpensive components, and has a simple construction, low cost, and compatibility with the existing lighting infrastructure.

SUMMARY OF THE INVENTION

In accordance with one aspect of the present invention there is provided an OLED area illumination apparatus, comprising:
 (a) an OLED device;
 (b) a variable power controller connected to the OLED device for providing variable power to the OLED device and responsive to a control signal; and
 (c) a feedback circuit for measuring the resistance of the OLED device and using the measurement signal for providing a control signal to control the variable power controller.

In accordance with another aspect of the present invention there is provided a method of providing power to an OLED area illumination apparatus, comprising:
 (a) providing an OLED device;
 (b) passing current through the OLED device;
 (b) measuring the resistance of the OLED device; and
 (d) modifying the current passed through the OLED device in response to the measured resistance.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

It will be understood that the figures are not to scale since the individual layers are too thin and the thickness differences of various layers too great to permit depiction to scale.

DETAILED DESCRIPTION OF THE INVENTION

Figure 1:
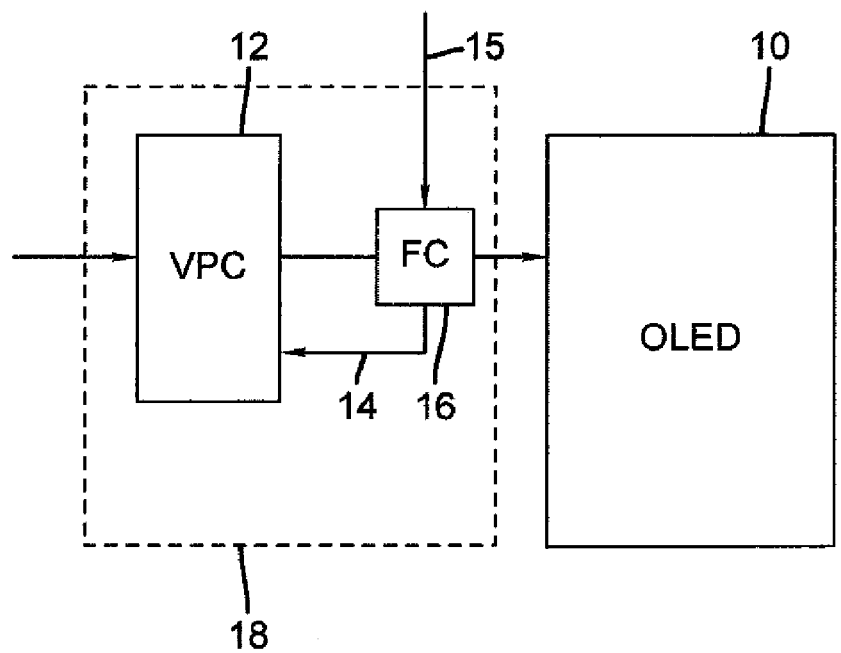
FIG. 1 is a schematic diagram of one embodiment of the present invention.
Figure 2:
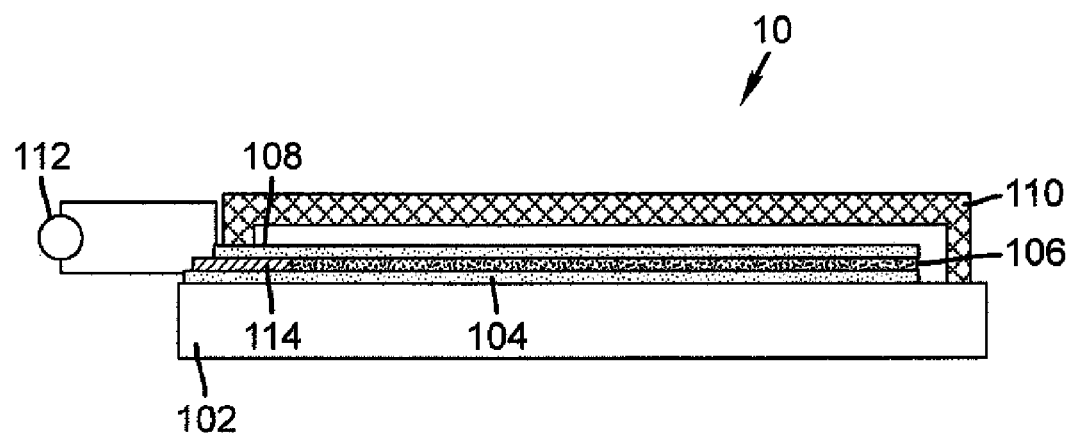
FIG. 2 is a prior-art schematic illustration of the cross section of an OLED device.

Referring to FIG. 1, an OLED area illumination apparatus comprises an OLED device 10; a variable power controller 12 connected to the OLED device 10 for providing variable power to the OLED device 10 and responsive to a control signal 14 in a controller 18; a feedback circuit 16 for measuring the resistance of the OLED device 10 and forming the control signal 14 in response to the resistance measured to control the variable power controller 12 to compensate for OLED device 10 aging. A reference signal 15 is provided to feedback circuit and is for obtaining measurements of the resistance of the OLED. Power may be provided externally from a variety of sources to the variable power controller 12, for example by connection to available household or commercial power grids nominally employing 120 or 240 volt alternating circuit power at a 50 Hz or 60 Hz frequency.

The variable power controller 12 may employ a variety of means to vary the power supplied to the OLED device 10. A wide variety of means are known in the art using, for example mechanical, electronic, or electromechanical means. For example, a variable resistor may be employed to vary the voltage supplied to the OLED device 10. Alternatively, the variable power source may employ pulse width modulation to vary the power supplied to the OLED device. Pulse width modulation techniques are well known in the prior art and are referenced above.

A variety of means are also known for measuring the light output of an OLED device, as described above. However, experiments performed by applicant have demonstrated that the current used by an OLED device is an accurate predictor of the light output from the OLED device and that changes in current as the OLED ages are due to increased OLED device resistance. At a given voltage, this increased resistance has the effect of reducing the current passed through the organic layers 106 making up the OLED device 10, and less light is output from the OLED device. Therefore, according to the present invention, as the OLED device is used, the resistance of the OLED device is measured using a feedback circuit 16 and a feedback signal 14 is generated in response to the measured resistance and supplied to the variable power controller 12. Using Ohm's Law, the resistance through the OLED may be calculated by measuring the current passing through the OLED device 10 if the voltage placed across the electrodes 104 and 106 is known. For example, the current may be measured as a voltage across a low-resistance measurement resistor connected in series with the OLED device. In this example, the control signal 14 is then a voltage signal. The voltage signal is supplied as shown in FIG. 1 to the variable power controller 12 to control the voltage supplied to the OLED device 10.

Figure 4:
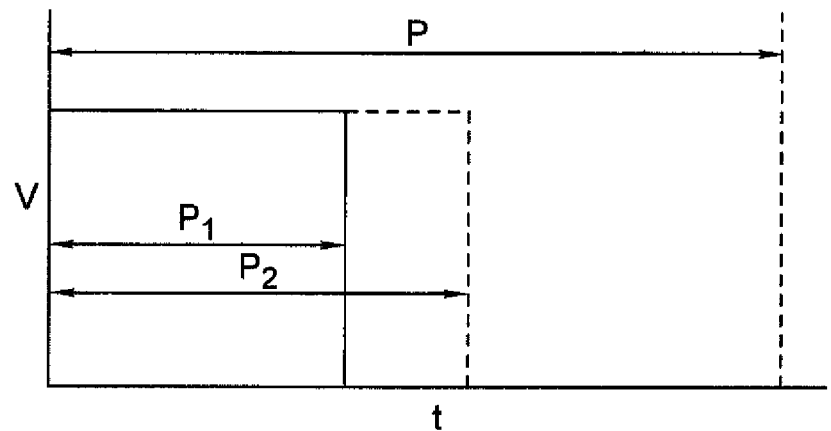
FIG. 4 is schematic diagram of a single time period during which power (voltage) is provided to OLED device.

Simple pulse width modulation devices responsive to voltage control exist at a low cost, may be used in a variable power controller, and are employed today in dimmer controls. Referring to FIG. 4, pulse width modulation power controls provide power at a predetermined voltage V during a predetermined portion $P_1$ of a period P and provide power at a different voltage during the remainder of the period.

Typically, the voltage supplied during the remainder of the period is zero; that is no power is supplied to the OLED device. Hence, the OLED device is rapidly turned on and off during each period. To avoid annoying flicker in an area illumination device, the period is typically set to $\frac{1}{30}^{th}$ or, preferably $\frac{1}{50}^{th}$ or $\frac{1}{60}^{th}$ of a second to match the frequency of a conventional household power supply. The voltage may be any predetermined voltage, for example a standard household voltage such as a nominal 120 or 240 volts. To increase the power supplied to the OLED device, the predetermined portion of the period is increased while the remaining portion is decreased, that is the OLED device is turned on for a longer part of each period.

As the OLED ages, its resistance increases and the amount of current passing through it at a given voltage will decrease. This decrease is measured by the feedback circuit 16 and signaled by the control signal 14 to the variable power controller 12. The variable power controller then increases the length of the predetermined portion of the period to $P_2$ to increase the time that the OLED emits light, albeit at a reduced brightness and current. Integrated over the period, the OLED device experiences a constant current (although within the period the current is either on at a diminishing level over time or off). Hence, the total amount of light emitted by the OLED may remain constant. When the predetermined portion of the period equals the length of the period, the variable power controller can no longer compensate for increased aging in the OLED device, and the OLED device will begin to gracefully fail, growing dimmer as it continues to age.

Figure 5:
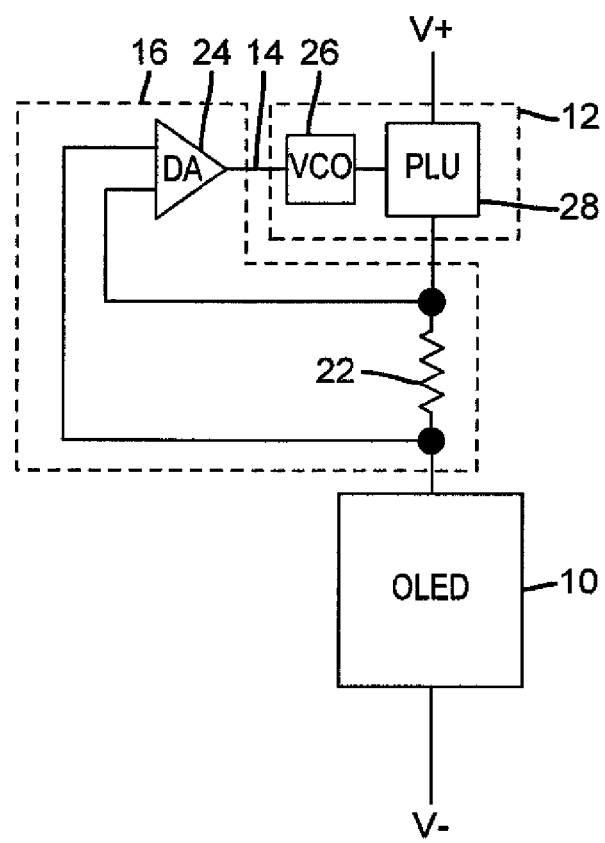
FIG. 5 is schematic diagram similar to FIG. 1 illustrating in greater detail components of one embodiment according to the present invention.

Referring to FIG. 5, in one embodiment a calibrated low-resistance measurement resistor 22 may be employed to measure the current passing through the OLED device 10. As the OLED device 10 ages, its resistance increases and the amount of current passing through it at a given voltage will decrease. This decrease may be measured as a voltage decrease across measurement resistor 22.

The voltage output from differential amplifier 24 connected across the measurement resistor 22 will decrease as the current decreases and increase as the current increases and is provided to a voltage-controlled oscillator 26. The voltage-controlled oscillator 26 may provide a minimum frequency at a voltage input of 0 volts and a maximum frequency selected to control the maximum current through the OLED device 10 and calibrated to the output range of the differential amplifier 24 (when the OLED device 10 is turned on). The voltage-controlled oscillator 26 may be connected to a power switch 28 for turning on the OLED device 10 for a predetermined portion of the period corresponding to the frequency output by the voltage-controlled oscillator 26.

Figure 6:
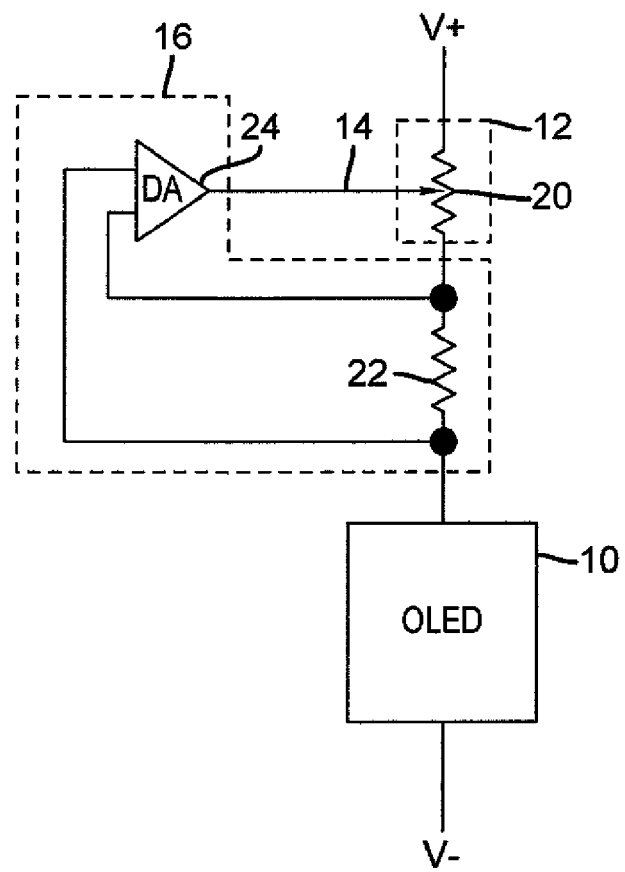
FIG. 6 is schematic diagram similar to FIG. 1 illustrating in greater detail components of modified embodiment according to the present invention.

In an alternative embodiment as illustrated in FIG. 6, like numerals indicating like parts and operations as previously described, a variable resistor is placed in series with the OLED device. As the OLED ages, its resistance increases and the amount of current passing through it at a voltage will decrease. This decrease is measured by the feedback circuit 16 and signaled by the control signal 14 to the variable power controller 12. The variable power controller then reduces the series resistance through the circuit thereby reducing the voltage dropped across the variable resistor and increasing the voltage placed across the OLED device. In the embodiment of FIG. 6, a voltage-controlled variable resistor 20 is placed in series with the OLED device 10 and a calibrated low-resistance measurement resistor 22. As the OLED device 10 ages, its resistance increases and the amount of current passing through it at a given voltage will decrease. This decrease will be measured as a voltage decrease across measurement resistor 22. The voltage output from differential amplifier 24 connected across the measurement resistor 22 will decrease as the current decreases and increase as the current increases. The voltage-controlled variable resistor 12 is turned on to its minimum resistance at a voltage input of 0 volts and to a maximum resistance selected to control the maximum current through the OLED device 10 and calibrated to the output range of the differential amplifier 24. As configured, such a feedback circuit can also provide low-pass filtering of an ac rectified signal to a signal having reduced amplitude.

Figure 7:
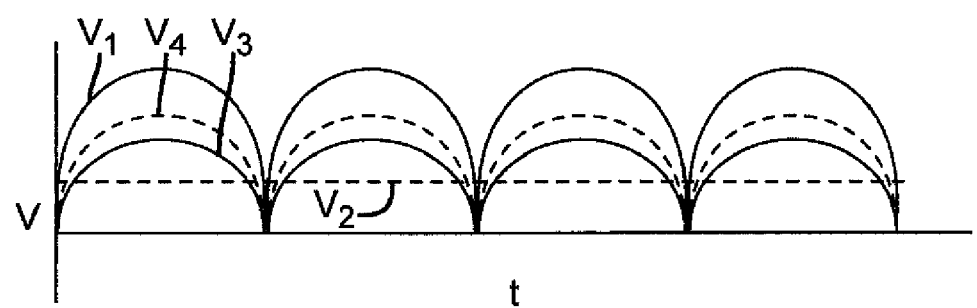
FIG. 7 is a schematic diagram illustrating use of a rectified AC power source for supplying power to an OLED device made in accordance with the present invention.

Referring to FIG. 7, a rectified ac input power voltage $V_1$ can be transformed to an OLED device input voltage having reduced amplitude $V_2$. Alternatively, the OLED device input voltage may be controlled to range from a lower voltage $V_3$ to a higher voltage $V_4$ as the OLED device ages and its resistance increases. This increase in average voltage will maintain a constant average current passing through the OLED device, maintaining the brightness of the OLED despite increased resistance in the OLED. When the variable resistance is at zero, the variable power controller can no longer compensate for increased aging in the OLED device, and the OLED device will begin to gracefully fail, growing dimmer as it continues to age.

The initial level of current provided to the OLED device may be set at a pre-determined value by providing a reference value for the amount of current desired at an initial state. If a voltage feedback signal is employed, for example, a reference voltage may be provided and a comparison made between the reference voltage and the actual voltage. If the actual voltage is lower, the feedback signal drives an increase in voltage supplied to the OLED device. If the actual voltage is higher, the feedback signal drives a decrease in voltage supplied to the OLED device. In this way, a consistent current is provided to the OLED device despite potential manufacturing variability in the OLED device resistance and in the presence of increasing aging due to use. Applicants have done numerous experiments measuring the resistance/brightness ratio at suitable current levels for OLED devices.

It is also possible that manufacturing variations can affect the efficiency of the OLED devices independently of the resistance through the OLED materials. For example, different formulations of OLED materials may have different light-emitting properties while their resistance is the same. To compensate for this possibility, it is possible to calibrate the output of any OLED device by setting the reference signal appropriately. Referring to FIG. 1, a reference signal 15 is provided. Using this method, a manufactured OLED is first driven with a known current and the light output measured. The light output measured is then compared to a desired light output and if they are the same, the reference is set so that the control signal will drive the variable power controller at that current. If the light output measured is higher than the light output desired, the reference signal is set to so that the control signal will drive the variable power controller at a lower current. If the light output measured is lower than the light output desired, the reference is set so that the control signal will drive the variable power controller at a higher current. In this way, a consistent light output may be provided for OLED devices made by a variable OLED device manufacturing process. Moreover, the use of the variable reference may also enable separate dimming control of the OLED device, perhaps by a consumer, even in the presence of an aging OLED device.

The present invention may be applied to either a direct current or an alternating current power source. In the case of a direct current source, the current will be on at a constant value when turned on. In the case of an alternating current source, the current will vary as the current source varies, as is well understood in the power supply art. Moreover, in the case of an alternating current source, a reverse bias may be applied to the OLED device that may improve its lifetime. The present invention may also be applied to OLED devices comprising a plurality of light-emitting elements and power may be provided to each of the light-emitting elements together or separately.

Figure 3:
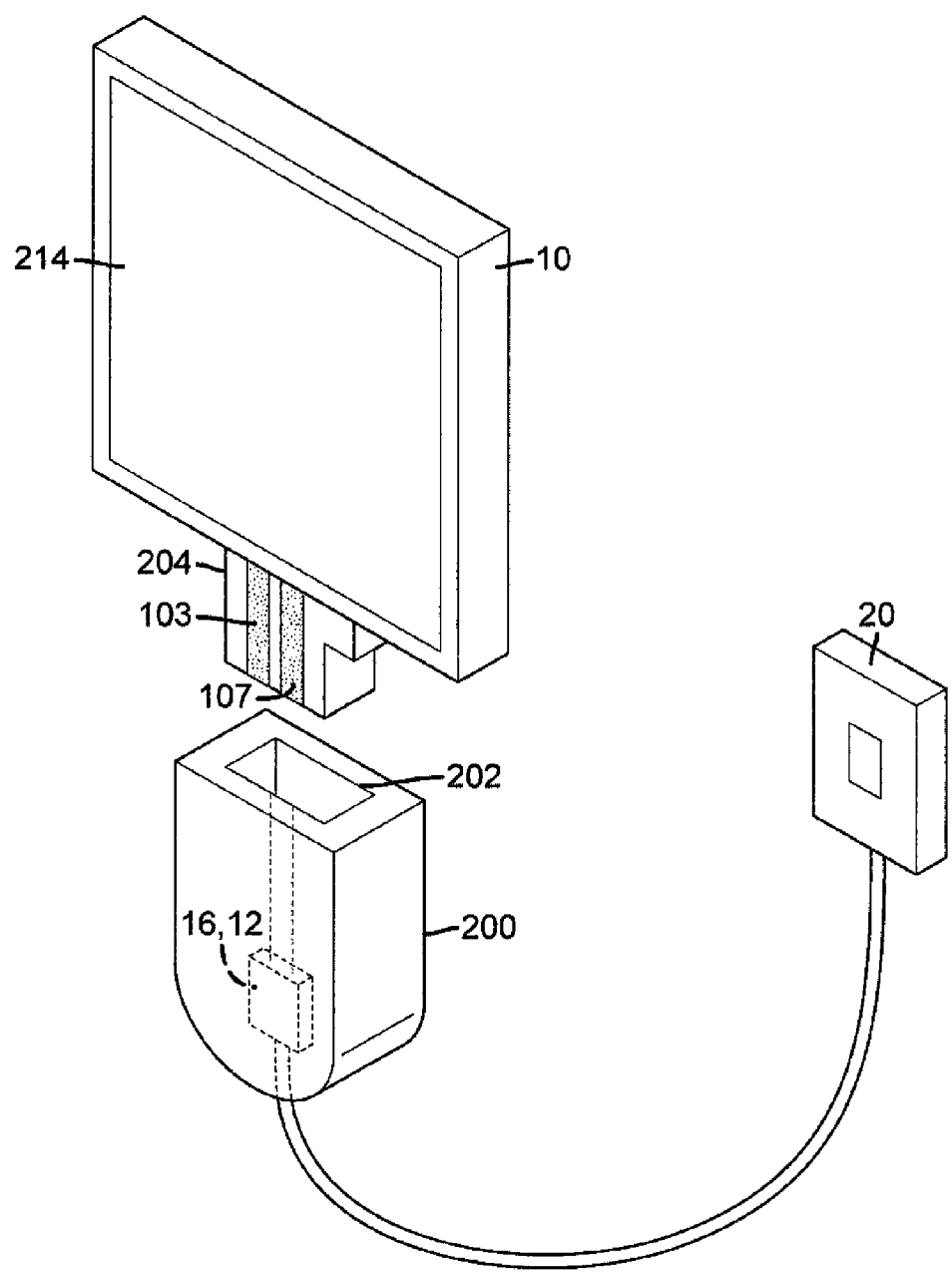
FIG. 3 is a perspective view of an OLED device, with a socket and integrated control according to an embodiment of the present invention.

Referring to FIG. 3, the variable power supply, feedback circuit, and feedback signal may be provided in a switch apparatus 20 or in a socket 200 (as shown). The switch apparatus 20 can turn power to the OLED device 10 on and off or provide dimming capability in cooperation with the power variation necessary to compensate for aging. The power may be conducted to the socket 200 with an opening 202 for removably inserting an OLED device 10 having a light-emitting area 214 and a corresponding tab 204 for insertion into the opening 202. Electrode connections 103 are and 107 provided on the tab 204 and are electrically connected to electrodes 104 and 108 to provide power to the OLED device 10.

The present invention can be employed in a wide variety of conventional applications, for example in a table-top lamp, floor lamp, or chandelier. Alternatively, the invention can be employed as a flat-panel illumination device for a conventional suspended ceiling. The present invention can also be employed in portable illumination devices using DC power sources.

In a preferred embodiment, the invention is employed in a device that includes Organic Light Emitting Diodes (OLEDs) which are composed of small molecule or polymeric OLEDs as disclosed in but not limited to commonly-assigned U.S. Pat. No. 4,769,292, issued Sep. 6, 1988 to Tang et al., entitled "Electroluminescent Device with Modified Thin Film Luminescent Zone" and commonly-assigned U.S. Pat. No. 5,061,569, issued Oct. 29, 1991 to VanSlyke et al., entitled "Electroluminescent Device with Organic Electroluminescent Medium. Many combinations and variations of organic light emitting materials can be used to fabricate such a device.

The invention has been described in detail with particular reference to certain preferred embodiments thereof, but it will be understood that variations and modifications can be effected within the scope of the invention.

PARTS LIST

10 OLED device
12 variable power controller
14 feedback signal
15 reference signal
16 feedback circuit
18 controller
20 switch
102 substrate
103 connector
104 electrode
106 organic layer(s)
107 connector
108 electrode
110 encapsulating cover
112 power supply
200 socket
202 opening
204 tab
214 light-emitting area

What is claimed is:

1. An OLED area illumination apparatus, comprising:
   (a) an OLED device;
   (b) a variable power controller connected to the OLED device for providing variable power to the OLED device and responsive to a control signal;
   (c) a feedback circuit for measuring a resistance of the OLED device and using said measurement signal for providing the control signal to control the variable power controller; and
   (d) a reference signal to which the feedback circuit is responsive, and wherein the feedback circuit compares the reference signal and the measured resistance of the OLED device to form the control signal.

2. The OLED area illumination apparatus of claim 1, wherein the variable power controller employs a variable resistor to vary the voltage supplied to the OLED device.

3. The area illumination apparatus of claim 1, wherein the variable power controller employs pulse width modulation to vary the power supplied to the OLED device.

4. The area illumination apparatus of claim 1, wherein the resistance is measured by measuring a current passed through the OLED device.

5. The area illumination apparatus of claim 4, wherein the current is measured as a voltage across a resistor connected in series with the OLED device.

6. The area illumination apparatus of claim 5, wherein the control signal is a voltage signal.

7. The area illumination apparatus of claim 1, wherein the variable power source provides power at a first predetermined voltage during a predetermined portion of a time period and at a second voltage different from the first predetermined voltage during the remainder of the time period.

8. The area illumination apparatus of claim 7, wherein the control signal varies the length of the predetermined portion of the period.

9. The area illumination apparatus of claim 1, wherein a constant current is maintained and passed through the OLED device.

10. The area illumination apparatus of claim 1, wherein the power supply provides a reverse bias to the OLED device.

11. The area illumination apparatus of claim 1, further comprising a reference signal to which the feedback circuit is responsive, and wherein the feedback circuit compares the reference signal and the measured resistance of the OLED device to form the control signal.

12. The area illumination apparatus of claim 1, wherein the reference signal is variable.

13. A method of providing power to an OLED area illumination apparatus, comprising:
   (a) providing an OLED device;
   (b) passing current through the OLED device;
   (c) measuring a resistance of the OLED device;
   (d) modifying the current passed through the OLED device in response to the measured resistance; and
   (e) measuring a light output of the OLED device at a known current and setting a reference signal in response to the light output measurement.

14. The method of claim 13 wherein current is provided at a predetermined voltage during a predetermined portion of a time period and the total current passed through the OLED is modified by changing the length of the predetermined portion of the time period.

15. The method of claim 13 wherein the current is modified by changing a predetermined voltage supplied to the OLED device.

16. A method of claim 13 further comprising the step of adjusting the reference signal by a user to brighten or dim the light output of the OLED device.

17. An OLED area illumination apparatus, comprising:
(a) an OLED device;
(b) a variable power controller connected to the OLED device for providing variable power to the OLED device and responsive to a control signal;
(c) a feedback circuit for measuring the resistance of the OLED device and using said measurement signal for providing a control signal to control the variable power controller; and
(d) a switch apparatus and wherein the feedback circuit and variable power controller are located in the switch apparatus.

18. An OLED area illumination apparatus, comprising:
(a) an OLED device;
(b) a variable power controller connected to the OLED device for providing variable power to the OLED device and responsive to a control signal;
(c) a feedback circuit for measuring the resistance of the OLED device and using said measurement signal for providing a control signal to control the variable power controller; and
(d) a socket for removably inserting the OLED device and electrically connecting power to the OLED device and wherein the feedback circuit and variable power controller are located in the socket.

19. A method of providing power to an OLED area illumination apparatus, comprising:
(a) providing an OLED device;
(b) passing current through the OLED device;
(c) measuring a resistance of the OLED device;
(d) modifying the current passed through the OLED device in response to the measured resistance; and
(e) adjusting the reference signal by user to brighten or dim the light output of the OLED device.

* * * * *